United States Patent [19]

Chutjian

[11] Patent Number: 4,818,868
[45] Date of Patent: Apr. 4, 1989

[54] TROCHOIDAL ANALYSIS OF SCATTERED ELECTRONS IN A MERGED ELECTRON-ION BEAM GEOMETRY

[75] Inventor: Ara Chutjian, La Crescenta, Calif.

[73] Assignee: The United States of America as represented by the Administrator of the National Aeronautics and Space Administration, Washington, D.C.

[21] Appl. No.: 154,713

[22] Filed: Feb. 11, 1988

[51] Int. Cl.[4] .......................... H01S 1/00; G01K 1/08; H01J 3/14
[52] U.S. Cl. ...................................... 250/252; 250/397
[58] Field of Search ............ 250/252.1 R, 397, 396 R, 250/139; 376/146; 324/71.3; 313/231.31

[56] References Cited

U.S. PATENT DOCUMENTS

| | | | |
|---|---|---|---|
| 3,435,208 | 3/1969 | Hansen et al. | 250/251 |
| 4,233,509 | 11/1980 | Tomura et al. | 250/306 |
| 4,347,621 | 8/1982 | Dow | 376/139 |
| 4,361,761 | 11/1982 | Treglio | 250/251 |
| 4,549,082 | 10/1985 | McMillan | 250/423 R |
| 4,568,833 | 2/1986 | Roelofs | 250/396 R |
| 4,639,301 | 1/1987 | Doherty et al. | 250/358 |
| 4,649,273 | 3/1987 | Chutjian et al. | 250/396 R |

Primary Examiner—Bruce C. Anderson
Attorney, Agent, or Firm—Thomas H. Jones; John R. Manning; Paul F. McCaul

[57] ABSTRACT

The method and apparatus of this invention provides a plurality of measurements indicative of the absolute cross section for excitation of an ion beam. The ion beam is merged for excitation by specific energies of electrons in an electron beam. Both beams are merged in an evacuated enclosure having a longitudinal magnetic field and a crossed uniform electric field. The ions and electrons interact over a known merged longitudinal length in a merged beam area. After collision, the electron and ion beams are demerged. Forward and backward-scattered electrons are collected and position-detected by a pair of microchannel plate arrays located at opposite ends of the longitudinal beam-merging area. A series of electron and ion primary current measurements are taken at full ion and electron beam strength. Measurements are also taken at greatly reduced beam strength to obtain a beam overlap profile.

21 Claims, 2 Drawing Sheets

TROCHOIDAL ANALYSIS OF SCATTERED ELECTRONS IN A MERGED ELECTRON-ION BEAM GEOMETRY

BACKGROUND OF THE INVENTION

1. Origin of the Invention

The invention described herein was made in the performance of work under a NASA contract, and is subject to the provisions of Public Law 96-517 (35 USC 202) in which the Contractor has elected not to retain title.

2. Field of the Invention

This invention relates to methods and apparatus for analyzing scattered electrons in electron-ion collisions. More particularly, such analysis involves merged electron-ion beams and high signal-to-noise measuring apparatus.

3. Background of the Invention

The measurement of electron scattering properties of singly and multiply-charged ionic species is important for understanding the behavior of the sun, stars, and several types of laboratory fusion devices (such as the Tokamak and mirror devices). In these classes of objects one encounters high ionic charge states, and electrons having energies in the range 10–1000 electron volts. Moreover, in order to understand the detailed behavior of these plasmas, one must know basic atomic properties, such as excitation and ionization cross sections with respect to electron collisions. (A cross section represents a probability for the ionic target undergoing an excitation or an ionization step, for example, by collision with an electron.)

It is known to measure electrons that are scattered by an ion beam and relate the measured amounts to the cross section of an ion beam. Apparatus for such measurements are normally characterized by measuring a very small fraction of scattered electrons. For example, it is known to use ion and electron beams with only about one hundredth of a percent of the scattered electrons being measured at a time.

In the past, a sequence of measuring angles has been employed in which a measurement is taken for each angle in the angle-by-angle sequence. Only about one hundredth of a percent of the scattered electrons is measured at each scattering angle. Such a small percentage provides a low signal-to-noise ratio for the measuring apparatus. This low signal-to-noise ratio results in diminished sensitivity for such an apparatus, with long data accumulation times.

A search of the prior art has been conducted which revealed several patents that exemplify the general state of prior art related to this invention.

First, attention is directed to Chutjian et al U.S. Pat. No. 4,649,273 which discloses a device for producing ground state atomic oxygen including an electron gun providing, in combination with a magnetic coil, a high density beam of electrons for colliding with a perpendicular target beam of oxygen molecules. The target beam moves in and out of the paper in the drawing of FIG. 1 of that patent. An $O^-$ ion beam, produced from attachment of the electrons to the molecules, is passed through a laser beam which detaches the electrons from the negative ions, producing O atoms. Electric field plates and Faraday cups are provided to draw off and collect the remaining $O^-$ ions and electrons. Trochoidal deflection is used, but no energy analysis or particle detection is done. The trochoidal deflectors are used to spatially separate two beams ($O^-$ and electrons) having very different velocities. See FIG. 1 and column 4, line 63 to column 5, line 68.

Next, attention is directed to Tamura et al U.S. Pat. No. 4,233,509 which discloses an ion-electron analyzer including an evacuated enclosure containing a charged particle source which extracts a negative ion beam and an electron beam from the charged particles and directs the two extracted beams onto a specimen. A screen detects the reflected electrons, and secondary ions. No energy analysis is performed on the scattered electrons at any point. The mass analysis of the ions in this reference patent is by a conventional electrostatic deflection and a magnetic sector technique. See the Figure and column 2, line 50 to column 3, line 34.

Roelofs U.S. Pat. No. 4,568,833 is cited as of interest for disclosing a structure used to focus and direct a beam of charged particles to a phosphor (TV screen), or to a suitable sensitive surface for ion, electron beam lithography. Multiple sources of the original beam are created and focused by an array of smaller mirrors comprising a larger mirror matrix. Sub-images are separately modulated and positioned so as to write on desired parts of the beam-sensitive target.

Next, attention is directed to Doherty et al U.S. Pat. No. 4,639,301 which discloses a device for using an ion beam to sputter etch a semiconductor material including a specimen surface having an ion and an electron beam impinging thereon. The electrons neutralize the positive charge of the incident ions thereby reducing the undesired field produced by the positive ions. While the named patentees cite the use of a microchannel plate to detect the electrons, no mention is made of energy dispersion in their apparatus or patent. Dispersion that does exist is purely electrostatic. See FIGS. 1 and 2 and column 2, line 35 to column 3, line 62 of the cited patent. The present application, in distinction, discloses trochoidal dispersion, i.e. a combined action of electric and magnetic fields.

SUMMARY OF THE INVENTION

The method and apparatus of this invention provides a novel structure and approach for obtaining a plurality of measurements indicative of the absolute cross section of an ion beam for excitation of specific energy levels of ions being studied. The invention requires several measurements which are related by the well known mathematical formula which can, in one form, be expressed as:

$$\sigma = \frac{Re^2 F v_e}{I_i I_e L}$$

where $\sigma$ is the excitation (or ionization) cross section, R is the signal rate of in elastically-scattered electrons (this can also be the elastically or super elastically-scattered rate), e is the electron charge, $v_e$ the electron velocity, $I_i$ the ion current and Ie the electron current. The quantity F is the beams overlap factor, having units of area, L is the length of the merged-beams interaction path, and the electron velocity is taken as much greater than the ion velocity.

Briefly, the subject invention comprises a merged beam, trochoidal analysis device including an evacuated enclosure within which a beam of electrons is longitudinally merged onto a beam of ions by electric field plates positioned in a uniform, axial magnetic field. The ions and electrons interact over a known merged length. After collision, the electrons are demerged by a second set of electric field plates in the uniform axial magnetic field and their positions are detected by an x-y position-sensitive detector. A series of electron and ion current measurements are taken at full ion and electron strength, and at greatly reduced strength during a beam profile overlap measurement. The overlap of the two beams in the interaction length is measured by means of stepped rotatable vanes which are positioned in the beam interaction area and are adapted to pass a specific but greatly reduced portion of the beams as compared to the individual, total electron and ion primary currents. Measurements are taken at separate Faraday cups without the vanes being present in the overlapped beams. The entire system is evacuated by one or more cryogenic pumps to maintain ultra high vacuum of $10^{-9}$ torr or less.

As the electrons of an electron beam are merged into an ion beam, the electrons lose (and sometimes gain) energy from collisions with the positive ions in the ion beam. The absolute probability (cross-section) of electrons losing (or gaining) a given amount of energy in interacting with a specific ion type is typical of the type of questions posed for researchers. The method and apparatus of this invention assists the user/researcher in answering these and similar types of questions by taking a plurality of measurements, which measurements include beams overlap, individual primary electron and primary ion currents, and forward and backward-scattered electron amounts. A pair of microchannel plate arrays are positioned to measure the magnitude of the desired signal in the forward and backward directions. Several known factors, such as the acceleration potentials for the electron and ion beams, and the length of the merged region contribute to the user/researcher's calculations.

More particularly, the novelty of this invention hinges on the following techniques and sequences:

(a) use of a trochoidal deflector to merge a beam of low-energy electrons onto a beam of singly or multiply-charged ions (positive or negative);

(b) use of a trochoidal analyzer to separate or demerge the parent electron beam from all the inelastically scattered electrons;

(c) use of a trochoidal analyzer to further disperse the inelastically-scattered electrons spatially;

(d) use of a microchannel plate (x-y array) to detect the energy-loss and intensity of the inelastically-scattered electrons;

(e) use of a series of rotatable vanes with small holes of known diameter in them to measure the current profiles in the electron and ion beams. This known technique is used to obtain the electron-ion beams overlap factor in several spatial positions along a merged length of the beams.

The features of the novel approach described herein has application to the following areas:

(a) measurement of excitation cross sections in singly and multiply-charged positive ions; and in singly-charged and multiply-charged negative ions;

(b) measurement of excitation cross section in neutral atoms and molecules, where the ion beam is replaced by a uniform background gas or beam of a neutral target;

(c) measurement of excitation cross sections in radicals, where the radical can be generated by a charge-exchange source upstream, and remains collimated into the merging region; (d) measurement of excitation cross (d) measurement of excitation cross sections in excited states of ions, neutral atoms, molecules and radicals where the excited state is either generated in the source, or by a counter-propagating, low-energy electron beam.

The use of the method and microchannel plate detection apparatus and the merged-beam configuration of this invention gives an approximate $10^3$ increase in signal-to-noise over the known crossed-beam prior art measuring technique.

DESCRIPTION OF THE PREFERRED EMBODIMENTS

Figure 1:
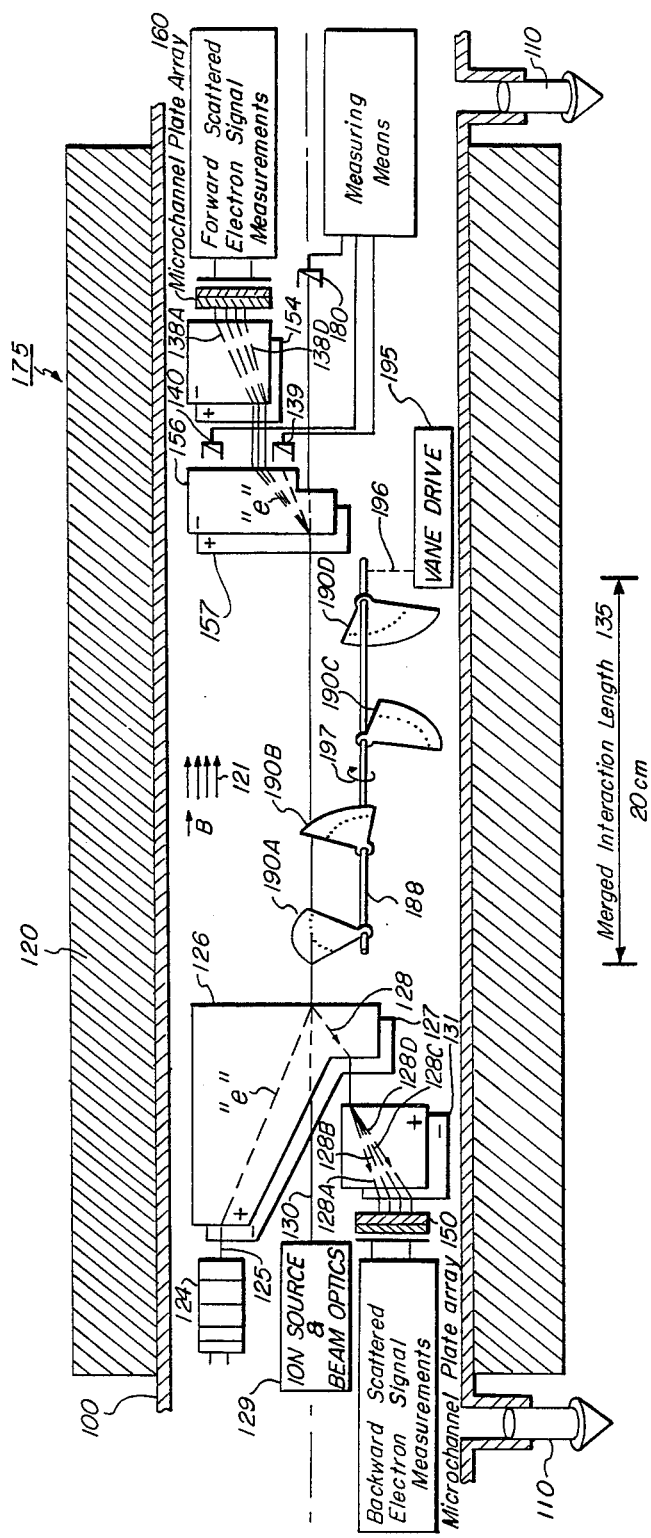
FIG. 1 is a drawing of a simplified longitudinal cross section taken through apparatus according to the present invention in a first embodiment thereof.

FIG. 1 depicts symbolically the analyzer 175 of this invention. A housing 100 is connected to cryopumps at 110 to maintain an ultra high vacuum within the housing 100. Cryopumps (not shown) evacuate the housing's interior and hold it at a vacuum of less than about $10^{-9}$ torr.

Surrounding the housing 100 and extending over the active components therein is a solenoidal magnet 120. The cylindrical magnet 120, when connected to an appropriate source of power (not shown) may be a normal or superconducting magnet. According to techniques well-known in this art, the magnet 120 produces a uniform magnetic field in the range of 0.002 through 0.1 tesla in the direction indicated by arrows 121.

An electron gun 124 at the upper left, of any well-known type, produces a beam of electrons "e" of known energy, which beam is indicated by a thin solid line 125. Electron beam 125 may be, when gun 124 is connected to any well-known power source (not shown), at an energy level of between 1 and 1000 electron volts. The nominal velocity of the electron beam is a function of its acceleration potential. That nominal velocity is known to the user/researcher.

A charged particle ion source 129 is located at the left on a longitudinal central axis 130 and the source 129 includes beam transport optics as necessary to form and focus an ion beam 130. Source 129 forms a beam 130 consisting of positive or negative ions to be analyzed by apparatus 175. The ion beam 130 may be either singly or multiply-charged, positive or negative, ions. Typical of the ions to be studied are oxygen, argon, sulphur, magnesium and the like. The nominal velocity of the ion beam, also a known factor, is related to the ion beam's acceleration potential.

Ion beam 130 is directed from source 129 into an electric field created by a pair of spaced electrostatic plates 126, 127. Plate 126 nearest to the viewer is connected to a positive voltage not shown, while the plate 127 behind it is connected to a negative potential of a suitable source, not shown. Such plates create an electric field located between the plates and into and out of the plane of the drawing. That electric field is crossed with the magnetic field 121. Such cross fields in a manner well-known, steer the electron beam 125 which is passing between them into a merged interaction area 135. The interaction area 135 in the apparatus is of a known length.

In one preferred embodiment, the beams were merged over a length 135 of twenty centimeters. In the merging area 135, electron beam 125 is merged with ion beam 130, and a large volume of interaction and hence of inelastically scattered electrons has been created.

Inelastically-scattered electrons (those that lose energy) are dispersed and position-detected by a pair of microchannel plate detector arrays 150,160. Such detector arrays detect both intensity and spatial position of the forward and the backward inelastically-scattered electrons. Primary electron current is collected and detected as a measurable signal at Faraday cups 139 and/or 140. Primary ion current is also collected and detected as a measurable signal at Faraday cup 1B0. I provide an extra Faraday cup 140 which is located above Faraday cup 139, which cup 140 is used to derive measurements relating to superelastic-scattered electrons (i.e., electrons which gain energy from the collision).

Positioned respectively at the front and at the rear location relative to the merged length 135, are a pair of microchannel plate arrays 150,160. Such arrays 150, 160, as well known, collect inelastically-scattered (or super-elastically- scattered) electrons and direct them onto a position sensitive detector provided in each array. The theory behind collection of both types of electrons will now be described.

It is known that slower moving electrons represent lower energy and thus undergo greater deflection in the crossed electrostatic and magnetic fields of plates 154,156 (or 126,131). Such slower moving electrons have higher position values on the x-y position detector of array 150, 160. Higher energy, or faster moving electrons, undergo lower deflections and have smaller position values. The amount of collected electrons creates detectable signals at different positions, which signals are indicative of the intensity of the electrons which have lost energy, (the so-called inelastically-scattered electrons). The fan shaped electron paths 128A, 128B, 128C, 128D of backward scattered electrons 128 depicts the paths of different, (successively lower), electron energies, and how those energies are displaced and position-detected by the microchannel plate array 150. Forward scattered electrons 138, are depicted as being displaced rays 138A, 138B, 138C, 138D and position-detected at microchannel plate array 160. Provision is also made to measure and determine the absolute detector sensitivity of both microchannel plate arrays 150,160 with a known standard of electron current. The user/researcher relates the detector signal measurements to the actual number of electrons striking the detector, and hence can obtain measurements which are useful in obtaining an absolute scattering cross section of the ion beam.

At the right of FIG. 1, located in a demerging area 155A, are a pair of electric field plates 156, 157. Plate 156 nearest to the viewer is connected to a negative voltage source, while the plate 157 behind it is connected to a positive voltage source. The primary electron beam 125 is demerged by the demerging plates 156, 157 from the ion beam 130.

Overlap of beams 125 and 130 is measured by a plurality of thin fan-shaped metal vanes 190A, 190B, 190C, and 190D. Each fan-shape is about a seventy to seventy-five degree sector. Each fan is selected of an impervious material which would entirely block the overlapped electron and ion beams from reaching the demerging end of apparatus 175, were it not for each fan having a row of holes located therethrough. Each fan-shaped sector, in one embodiment, has nine small holes of known diameter located therethrough, which holes are oriented in a slightly spiral arc across the segment. The presence of a hole in a fan positioned in the merged beam lets a very small fractional part of the merged beam pass through the hole and reach the demerging area. The current readings on the Faraday cups, obtained when the fan-shaped sectors are passing only a very small controlled amount of the merged beams is in the order of one half of one percent of the full scale readings obtained when the vanes are not present.

Vanes 190A, 190B, 190C, and 190D are suitably spaced on axis 188 at known intervals, along interaction length 135. As shown, each vane is offset from the adjacent vane by an equal angular amount. A complete rotation of vane shaft 188 about its axis of rotation passes each vane on that shaft through the merged volume. Vanes 190 are driven in a stepped rotational amount by any suitable drive means 195 such as a computer-controlled stepper motor 195. The drive is shown symbolically by the dashed line 196 and arrow 197. The location of the row of holes from the axis of rotation 188 for vanes 190 is the same for each vane. However, each home of the arc in vane 190A, for example, is at a different distance from the axis of rotation 189. As these vanes rotate step-by-step, a spatial profile of the individual beams overlap is determined at each of the four positions 190A, 190B, 190C and 190D by taking electron and ion current measurements which correspond to the vane's position. Measurements are made both with the vanes present in the beam and at a separate time without the vanes impeding the beam overlap flow. These separate measurements provide additional data relating to the absolute cross section of the ion beam.

Smaller hole dimension and more holes in each fan-shaped sector create a finer sampling for the beams overlap measurements. Larger dimensions and lesser hole numbers create a suitable, but adequate, beams overlap measurement. Rotating vanes 190 gives a two-dimensional beams overlap measurement at four locations, from which a three-dimensional beams overlap, over the entire merged region, may be determined. Such beams overlap measurements are well-known in this art and thus no further description is required.

In operation an electron beam 125 and an ion beam 130 are formed in the presence of a high vacuum housing and a weak magnetic field. These beams are merged and demerged by trochoidal deflectors for an inelastic (or superelastic) electron collision.

In inelastic collisions, part of the kinetic energy of the merging electrons is converted to another form of energy such as, for example, internal electronic or vibrational excitation of the target ion, followed by radiation. Measurements in accordance with this invention are achieved after the inelastic collision over a known beam interaction length. Measurements are made of the primary electron current and the primary ion current. Simultaneous measurements are taken of signals indicative of backward-scattered and forward-scattered electrons. These latter simultaneous measurements are in the form of microchannel plate array signals indicative of intensity and spatial position of both forward and backward-scattered electrons. Predetermined measurements are also made of the detection sensitivity of the microchannel plate arrays and are known to the user/researcher. Beam overlap measurement are also provided. From these various measurements the absolute inelastic cross section for electron excitation of the ion beam may readily be derived.

Figure 2:
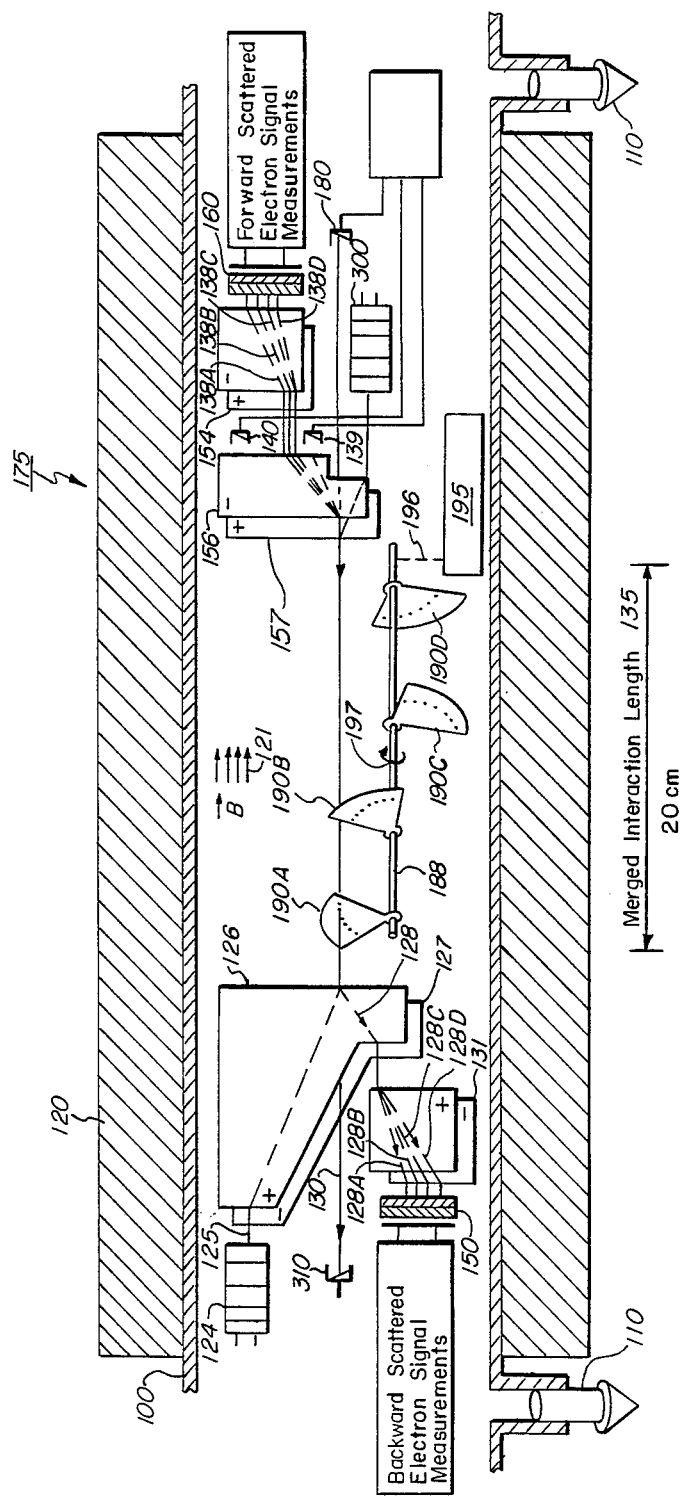
FIG. 2 is a similar longitudinal cross section where an excited state may either be generated in the source, or by a counter-propogating low energy electron beam, in accordance with another embodiment of the invention herein described and claimed.

FIG. 2 includes most of the same elements of FIG. 1, which elements are designated by the same reference numerals and function as described relative to FIG. 1. An additional electron gun 300 (FIG. 2) is employed to direct a counter-propagating electron beam 325. The electron beam 325 is moving in a direction opposite to that of the ion beam 130 of FIG. 2. An additional Faraday collection cup 310 is also shown in FIG. 2. Again, the electron beam's acceleration potential is known, as is the acceleration potential of the ion beam. The alternate method of creating ion excitation is within the method and apparatus of my invention as described and claimed. In FIGS. 1 and 2, both beams share a common longitudinal length 135 and a pair of microchannel plate arrays 150,160 are employed.

The above description presents the best mode contemplated in carrying out my invention. My invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawings

What is claimed is:

1. A method of determining the absolute excitation cross section of an ion beam, said method comprising the individual steps of:
    longitudinally merging an ion beam of a known nominal energy with an electron beam also having a known nominal energy;
    directing the merged beams along a longitudinal axis of a known length;
    demerging the electron and ion beams, and dispersing the electrons spatially according to their final energy;
    using a pair of microchannel plate arrays having a known sensitivity to electron detection for simultaneously measuring dispersed electrons that are scattered at the backward and forward ends respectively of said merged length;
    measuring the overlap of the merged ion and electron beams at several known points along the longitudinally merged beam;
    measuring the primary electron and primary ion currents; and
    relating all measurements to an absolute cross section of the ion beam by a known mathematical formula.

2. A method in accordance with claim 1 wherein said longitudinally merging step is further defined as:
    emitting an electron beam with a known acceleration potential;
    directing the electron beam along a magnetic field, and into an electrostatic field of known strength and of direction transverse to the electron beam's direction and the magnetic field; and said crossed fields, to merge onto a common longitudinal axis with an ion beam.

3. A method in accordance with claim 2 wherein said longitudinally merging step is further defined as:
    directing, into said crossed magnetic and electrostatic fields, an ion beam with a known acceleration potential;
    guiding the ion beam, by electrostatic focusing alone, onto said longitudinal axis so that both beams are aligned along the same direction as said magnetic field;
    overlapping said electron and ion beams along the longitudinal axis; and
    creating by said overlapped beams an electron and ion interaction which results in elastically, inelastically and superelastically scattered electrons.

4. A method in accordance with claim 1 wherein said demerging step is further characterized as:
    separating the primary electron beam from the overlapped ion and electron beams;
    forming an electric field between a pair of electric plates; and
    maintaining a magnetic field between said pair of electric-field-creating plates.

5. A method in accordance with claim .4 and further comprising the steps of
    steering the primary electron beam into an electron-beam collecting cup; and
    measuring at the output of the collection cup the strength (current) of the collected primary electron beam.

6. A method in accordance with claim 1 and comprising the additional steps of:
    guiding an electron beam into an electric field created between a pair of beam emerging plates;
    orienting the formed electron beam along a longitudinal axis positioned between the electric plates; and
    orienting the formed ion beam along said longitudinal axis and in the same direction as that of the electron beam.

7. A method in accordance with claim 1 and further characterized by:
    obtaining a two-dimensional spatial profile of the beam overlap along said merged beam longitudinal axis.

8. A method in accordance with claim 1 wherein the beam overlap measurement step is further characterized by:
    placing, at said known points, an otherwise impervious metal plate having a plurality of holes of known position and diameter therethough into the beams longitudinal overlapped length;
    stepping the plates through a series of steps at said several known points along said longitudinal length;
    passing an unknown but reduced amount of said overlapped beams not blocked by said plates to a primary ion and an electron collection area; and
    taking a series of measurements of the ion and electron currents at said collection area to obtain a profile of said overlapped electron and ion beams.

9. Apparatus for determining the absolute excitation cross section of an ion beam being studied in an evacuate enclosure having a uniform magnetic field along a predetermined longitudinal axis of said enclosure, by relating the spatial position and intensity of scattered electrons to said excitation cross section, said apparatus comprising:
    means for directing an ion beam of a known nominal energy along said longitudinal axis;
    means for creating, in said enclosure, an electron beam, also having a known nominal energy;

means for merging both beams together along said longitudinal axis for a known merged length;

means demerging the electron beam away form said ion beam for dispersing the electrons spatially according to their final energy;

a pair of microchannel plate arrays having a known sensitivity to electron detection for simultaneously measuring intensity and spatial position (energy) of the backward and forward scattered electrons at opposite ends of said known length along said axis;

means for measuring the overlap of the merged ion and electron beams at several known points along the length of said longitudinally merged beams; and means for measuring the primary electron and primary ion currents.

10. Apparatus in accordance with claim 9 wherein all measurements thereof are related to an absolute cross section of the ion beam by a known mathematical formula and further comprising:

a known acceleration potential for said emitted electron beam;

means for establishing an electrostatic field of known strength and direction on opposite sides of said emitted electron beam;

a magnetic coil means surrounding said elongated enclosure for creating therein a uniform magnetic field of known strength and direction, which magnetic field transversely crosses said electric field; and means for directing the electron beam to merge with said ion beam along said longitudinal (magnetic) axis.

11. Apparatus in accordance with claim 10 and further comprising means for directing said ion beam into said crossed magnetic and electrostatic fields so that both beams are aligned along and move in the same direction as said magnetic field.

12. Apparatus in accordance with claim 9 and further comprising means for separating the electron beam from its overlap with the ion beam.

13. Apparatus in accordance with claim 9 and further comprising means for steering the electron beam after its overlap into an electron-beam collecting cup; and means for measuring at the output of the collection cup the strength of the collected electron beam.

14. Apparatus in accordance with claim 13 and further comprising means for obtaining a two-dimensional spatial profile of the beam overlap of both of said beams along said merged beams' longitudinal axis.

15. Apparatus in accordance with claim 14 and further characterized by:

a plurality of beam profile measuring vanes, one each located at one of each of said known points with each plate having a plurality of holes of known position and diameter therethough;

means for stepping the plurality of said measuring vanes through a series of steps at said several known points along said merged longitudinal length of both said beams; and means for performing a series of measurements of the ion and electron currents passed by said measuring vanes to obtain a profile of said overlapped electron and ion beams.

16. Apparatus in accordance with claim 10 wherein said electron beam is a first beam and further comprising:

a second electron beam creating means; and means for directing said second beam in a direction opposite to said first electron beam and said ion beam.

17. Apparatus in accordance with claim 10 wherein said first electron beam is collected in a first ion collection cup and further comprising:

means for collecting said second electron beam in a second electron collecting cup.

18. Apparatus for studying an ion beam comprising:

means for forming a merged length, of an electron beam of known energy with an ion beam also having a known energy;

means for deriving a profile of beams overlap of both the ion and electron beams through measurements of the overlapped ion and electron beams currents;

means for measuring the primary electron and primary ion currents; and a pair of microchannel plate arrays at opposite ends of said merged length of said ion and electron beams for detecting the position and intensity of both forward and backward-scattered inelastic electrons.

19. A method of measuring the absolute cross section of an ion beam to be studied comprising the steps of merging an ion beam and an electron beam together along a common longitudinal axis over which said beams move;

measuring the intensity and position of both forward and backward-scattered electrons created by the interaction between the merged beams along said axis;

measuring, by a calibrated source of electron current, the sensitivity of detection to the forward and backward placed electrons in the measuring apparatus used to measure the scattered electrons;

demerging the ion beam from the electron beam ;

deriving a signal indicative of the primary ion current at an ion collection location;

deriving a signal indicative of the primary electron current at an electron collection location;

measuring the overlap of the merged ion and electron beams at several locations along the beams merged length;

correcting the measurements of forward and backward-scattered electrons to account for the measurement density;

calculating the nominal velocities of the electrons and ions based upon their acceleration potentials; and computing the absolute cross section of the ion beam from said known velocities and said measured values.

20. A method of determining the absolute excitation cross section of an ion beam, said method comprising the individual steps of:

longitudinally merging, over a known length, an ion beam of a known nominal energy with an electron beam also having a known nominal energy;

dispersing electrons demerged away from the ion beam spatially according to their final energy;

using a pair of microchannel plate arrays having a known sensitivity to electron detection for simultaneously measuring dispersed electrons that are scattered at the backward and forward ends respectively of said merged length;

measuring the overlap of the merged ion and electron beams at several known points along the longitudinal merged beam;

measuring the primary electron and primary ion currents; and relating all measurements to an absolute cross section of the ion beam by a known mathematical formula.

21. Apparatus for determining the absolute excitation cross section of an ion beam which is overlapped and merged with an electron beam at several known points along a longitudinally merged beam by relating, through a known mathematical formula, an electron energy measurement at a plate array with measured values of the primary electron and primary ion currents, said apparatus comprising:

means for longitudinally merging, over a known length, an ion beam of a known nominal energy with an electron beam also having a known nominal energy;

means for dispersing electrons demerged away from the ion beam spatially according to their final energy; and a pair of microchannel plate arrays for simultaneously measuring the final energy of dispersed electrons that are scattered at the backward and forward ends respectively of said merged length.

* * * * *